(12) United States Patent
Beer et al.

(10) Patent No.: US 7,101,092 B2
(45) Date of Patent: Sep. 5, 2006

(54) MODULE HAVING A CIRCUIT CARRIER AND AN ELECTRO-OPTICAL TRANSDUCER AND METHOD FOR PRODUCING THE SAME

(75) Inventors: Gottfried Beer, Nittendorf (DE); Thomas Killer, Hohenschambach (DE)

(73) Assignee: Infineon Technologies AG, Munich (DE)

( * ) Notice: Subject to any disclaimer, the term of this patent is extended or adjusted under 35 U.S.C. 154(b) by 172 days.

(21) Appl. No.: 10/797,365

(22) Filed: Mar. 10, 2004

(65) Prior Publication Data
US 2004/0208460 A1 Oct. 21, 2004

(30) Foreign Application Priority Data
Mar. 10, 2003 (DE) .............................. 103 10 616

(51) Int. Cl.
*G02B 6/12* (2006.01)
*G02B 6/36* (2006.01)

(52) U.S. Cl. ............................. 385/92; 385/14; 385/88

(58) Field of Classification Search .................. 385/53, 385/88, 92–94, 14
See application file for complete search history.

(56) References Cited

U.S. PATENT DOCUMENTS 5,329,604 A   7/1994   Baldwin et al.
2003/0201462 A1* 10/2003 Pommer et al. ............ 257/200

FOREIGN PATENT DOCUMENTS

| DE | 198 04 031 A1 | 8/1998 |
| DE | 197 18 950 A1 | 11/1998 |
| WO | WO 98/50811 | 11/1998 |

* cited by examiner

*Primary Examiner*—Brian Healy
*Assistant Examiner*—Jerry Martin Blevins
(74) *Attorney, Agent, or Firm*—Dicke, Billig & Czaja, PLLC

(57) ABSTRACT

The invention relates to a module having a circuit carrier and having an electro-optical transducer mounted thereon for coupling in or out optical beams which are fed or conducted away via an optical fiber. The electro-optical transducer has an optical waveguide holder mounted onto a circuit carrier, the end side of which optical waveguide holder has an optoelectronic component having an optically active region, the optically active region being oriented to an optical waveguide receptacle of an optical waveguide holder.

20 Claims, 3 Drawing Sheets

MODULE HAVING A CIRCUIT CARRIER AND AN ELECTRO-OPTICAL TRANSDUCER AND METHOD FOR PRODUCING THE SAME

CROSS-REFERENCE TO RELATED APPLICATIONS

This Utility Patent Application claims priority to German Patent Application No. DE 103 10 616.2, filed on Mar. 10, 2003, which is incorporated herein by reference.

BACKGROUND

The invention relates to a module having a circuit carrier and having an electro-optical transducer mounted thereon for coupling in and out optical radiation which is fed or conducted away via an optical fiber. Furthermore, the invention relates to a method for producing a suitable electro-optical transducer and a corresponding module. Electro-optical transducer is both an optoelectronic transducer and an electro-optical transducer.

Modules with an electro-optical transducer have a large space requirement on account of transitional constructions from the optical fiber to corresponding optoelectronic or electro-optical transducers and to the circuit carrier, especially as the height of the constructions on the circuit carrier in the region of the transitional constructions considerably exceeds the heights of the remaining electronic components of the module in the form of integrated circuits. Such modules are not only voluminous but also unwieldy. They are thus exposed to an increased risk of the module being able to be damaged both in the optoelectronic coupling-on region and in the electro-optical coupling-out region during mounting, maintenance and/or exchange.

A module that can be handled with higher security against damage would be a useful improvement.

SUMMARY

One embodiment of the invention is a module having a circuit carrier and having an electro-optical transducer mounted thereon. The electro-optical transducer comprises an optical waveguide and an optoelectronic component adapted to this holder. The optical waveguide has an optical waveguide receptacle, which can receive optical waveguides, infrared conductors, UV conductors and other optical fibers. Furthermore, the optical waveguide holder has a mounting area on an edge side. With this mounting area, the optical waveguide holder can be mounted directly on the circuit carrier. Consequently, the optoelectronic component is not mechanically loaded or misadjusted either by the introduction of an optical fiber into the optical waveguide receptacle or by the optical fiber being laid within a device.

The optoelectronic component has an optically active region on an active top side of a semiconductor chip and has a housing with a housing outer edge side in elongation of the mounting area. Arranged on said housing outer edge side is at least one contact area for electrically connecting the semiconductor chip to the circuit carrier. The optoelectronic component is arranged with its optically active region on an end side of the optical waveguide holder in such a way that the optical waveguide receptacle and the optically active region are oriented with respect to one another. This orientation is not mechanically loaded in any way after the receiving of an optical waveguide or in the form of an optical fiber in the optical waveguide receptacle. Consequently, the optical orientation of the optically active region to the optical waveguide receptacle is not jeopardized and is preserved even under extremely great loading due to improper handling.

The mounting area, with which the optical waveguide holder is mounted directly on the circuit carrier, is arranged at right angles with respect to the end side of the optical waveguide holder. The provision of such a mounting area for the electro-optical transducer means that said electro-optical transducer becomes a surface-mounted component of the module such that the structural height of the module is minimized. Also, the mounting of the electro-optical transducer on the circuit carrier is compatible with the mounting of the surface-mounted further electronic components for completing the module. Consequently, the same mounting technology can be used for all the components of the module which are to be applied to the circuit carrier, which minimizes the mounting costs for the module.

A high mechanical accuracy between optical waveguide receptacle and optically active region of the optoelectronic component is ensured even in single-mode applications. On the one hand, despite the minimized height, the optical waveguide receptacle is arranged in the optical waveguide holder in a large-area manner and, on the other hand, the optoelectronic component can be oriented and adjusted in a large-area manner with its housing on the end side of the optical waveguide holder still prior to a process of soldering the mounting area on the circuit carrier.

For soldering-resistant connection between the end side of the optical waveguide holder and the housing of the optoelectronic component, it is possible to employ a high-temperature-resistant UV adhesive bonding or welding onto an adaptor intermediate piece previously applied by adhesive bonding. Furthermore, the mounting area of the optical waveguide holder which is mounted directly on the circuit carrier ensures a sufficient stability during the further surface mounting or the further soldering processes for the surface mounting of the remaining electronic components. This connection between optical waveguide holder and circuit carrier also withstands acceleration processes during further mounting and placement processes completely in tact. The risk of damage due to handling is thus reduced.

Furthermore, it is provided that the module has an optoelectronic transducer at a module input and an electro-optical transducer at a module output. Such an optoelectronic transducer may have a semiconductor chip with a photodiode or a phototransistor, while the electro-optical transducer is equipped with a semiconductor chip having a light-emitting diode or a laser diode. Between input and output, further electronic components with semiconductor chips, which have integrated circuits, are arranged on the circuit carrier. Thus, the laser chip in the electro-optical transducer in the output may be driven directly by a driver IC on the circuit carrier. Moreover, on the input side, a photodiode in the opto-electronic transducer of the input may interact with a TIA chip on the circuit carrier. Such driver ICs and TIA chips may be mounted in a housing on the same housing substrate.

Furthermore, it is provided that the optoelectronic component has a semiconductor chip, which is connected to inner sections of flat conductors on its active top side. Such a flat-lead frame-based component construction of an optoelectronic component has the advantage that it is possible to employ a technique which has proven successful in mass production. In one embodiment of the present invention, outer sections of the flat conductors are arranged on one side at an individual housing outer edge in order to realize an arrangement of contact areas in elongation of the mounting area.

In one embodiment, instead of the flat conductors, a rewiring plate with rewiring lines is provided, and the rewiring plate leaves the active optical region of the semiconductor chip free. For the contact area which is accessible on the edge side, it is possible to employ incipiently cut through contacts of the rewiring plate, thereby ensuring a reliable contact connection of the optoelectronic component on one of the outer edge sides of the housing. Such contact areas may be reinforced by a solder deposit or by fitting external contacts in the form of solder balls, thereby enabling a reliable connection to lines of the circuit carrier.

An inexpensive solution for realizing a circuit carrier is a printed circuit board. For high-quality, in particular radiofrequency, applications, multilayer ceramic substrates are used as the circuit carrier of a module according to one embodiment of the invention with an electro-optical transducer. Furthermore, it is also possible to use a flexible multilayer conductor track sheet as a circuit carrier, since reliable function of the electro-optical transducer according to one embodiment of the invention does not depend on the stability and stiffness of the circuit carrier.

Furthermore, the optical waveguide holder according to one embodiment may have two regions, the first region having a sleeve with a locking and unlocking device for receiving the optical waveguide and the second region forming a dimensionally stable part with the end side and the mounting area. In the case of a sleeve made of plastic for the first region, the second region is also formed from a plastic. This second plastic region is filled with dimensionally stabilizing fillers in such a way that the orientation of the end side with respect to the mounting area does not change in the event of heating. Furthermore, particularly if the bearing area of the mounting area on the circuit carrier does not appear to be sufficiently stable or does not appear to be sufficiently large enough, the end side may have a mechanical supporting element which forms a type of gusset plate between end side of the optical waveguide holder and top side of the circuit carrier. Such a mechanical supporting element may also be arranged in the form of stiffening ribs directly on the end side, so that the optical waveguide holder and the supporting ribs can be produced in one piece in a die-casting step.

One method for producing an electro-optical transducer is provided. An optical waveguide holder with an end side is die-cast with molding-in of an optical waveguide receptacle in the direction of the end side and with molding-on of a mounting area on an edge side at right angles with respect to the end side. An optoelectronic component is produced in matching fashion for the end side of the optical waveguide holder. For this purpose, a semiconductor chip with an optically active region is applied to a rewiring structure comprising flat conductors or comprising a rewiring plate with rewiring lines.

This takes account of the fact that the flat conductors from the outset have thicknesses which can automatically supply the one-sided contact areas according to the invention when the flat conductors are stamped from a flat leadframe. By contrast, rewiring lines lying on an insulating plate are such thin structures that a severing of the rewiring lines in edge regions does not supply reliable contact areas. Therefore, provision is made for arranging through contacts on the edge of the rewiring plate to be severed, which through contacts form relatively large contact areas in the edge region when the rewiring plate is cut off or severed.

After a semiconductor chip has been applied to the flat conductors, or the rewiring lines, the optoelectronic region is connected to the flat conductors or the rewiring lines via conductor tracks. This connection may be effected by soldering, by bonding or by application of a conductive adhesive.

For the formation of contact areas which are intended to occur only one side on an edge side, it is entirely possible to employ conventional flat leadframes, the flat conductors which emerge at the remaining edges being separated off and not connected up. Equally, a flip-chip technique may be used for this purpose. Finally, in order to complete the optoelectronic component, the semiconductor chip and the inner sections of the flat conductors or of the rewiring lines of a rewiring plate or flip-chip contacts are packaged in a housing whilst leaving free the contact areas and possibly also the optically active areas. In this case, the packaging of the optically active region of the semiconductor chip depends on whether the packaging material is transparent to the corresponding operating wavelength of the optical waveguide.

The optoelectronic component is subsequently applied to the end side of the optical waveguide holder with orientation of the contact area in elongation of the mounting area and with orientation and adjustment of the optical waveguide receptacle with respect to the optically active region of the semiconductor chip. The stability can be further increased by means of high-temperature-resistant adhesive. For this purpose, it is possible to use a UV adhesive which, after it has cured, has a higher decomposition temperature than the soldering temperature required for soldering the electro-optical transducer onto the circuit carrier, so that even in the case where this module is soldered onto a superordinate circuit board, a renewed melting of the soldering connection is inconsequential and the position of the oriented optoelectronic component with respect to the optical waveguide holder remains unchanged during the subsequent soldering operations.

The conductor tracks of the semiconductor chip of the optoelectronic component may be electrically connected to the flat conductors or the rewiring lines by means of bonding technology via bonding wires. This bonding method can be used in diverse fashion, but the bonding wire connections are sensitive to thermal stresses such as occur between a plastic housing and a semiconductor chip. In order to avoid bonding connections, the semiconductor chip may be adhesively bonded by a conductive adhesive or else soldered onto inner sections of the flat conductors of a flat leadframe, if the semiconductor chip is provided with corresponding external contacts, such as flip-chip contacts or elevated area contacts.

A method for producing a module after an electro-optical transducer as explained above has been produced is also provided. The electro-optical transducer is adhesively bonded or soldered onto an edge region of the circuit carrier by its mounting area and the contact areas of the electro-optical transducer are subsequently connected to corresponding circuit carrier lines by soldering or by a conductive adhesive. For the adhesive bonding of the electro-optical transducer onto the circuit carrier, it is again possible to employ a high-temperature-resistant adhesive in order to increase the stability, so that even in the case where this module is soldered onto a superordinate printed circuit board, a renewed melting of the soldering connection is inconsequential. This is because, by virtue of the high-temperature-resistant adhesive bonding of the electro-optical transducer, the position of the electro-optical transducer is no longer changed during subsequent soldering.

If the mounting area is intended to be soldered onto the circuit carrier, then a diffusion soldering process is preferably employed, during which intermetallic phases form, so that this diffusion-soldered joint is thermally stabler than the subsequent soft-solder joint for the connection of the contact areas of the electro-optical transducer to the circuit carrier lines. Instead of the contact areas being soldered to the circuit carrier lines, however, it is also possible to effect a connection by means of a conductive adhesive which crosslinks at lower temperatures than a soldering operation and ensures an electrical connection.

In addition to the abovementioned possibilities for realizing the opto-electronic component with one-sided contact areas by means of flat conductors or by means of rewiring lines and/or by means of incipiently cut rewiring plates with through contacts, it is also possible to employ VQFN housings with connection pads situated directly at the housing edge or a BGA housing with balls situated directly at the housing edge, as housing for the optoelectronic component.

The required quantity of solder may be ensured by means of a corresponding design of the contact area both on the circuit carrier and by solder additionally applied to the contact areas, as can be realized by the application of balls to VQFN, TSLP or TCCN housings.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
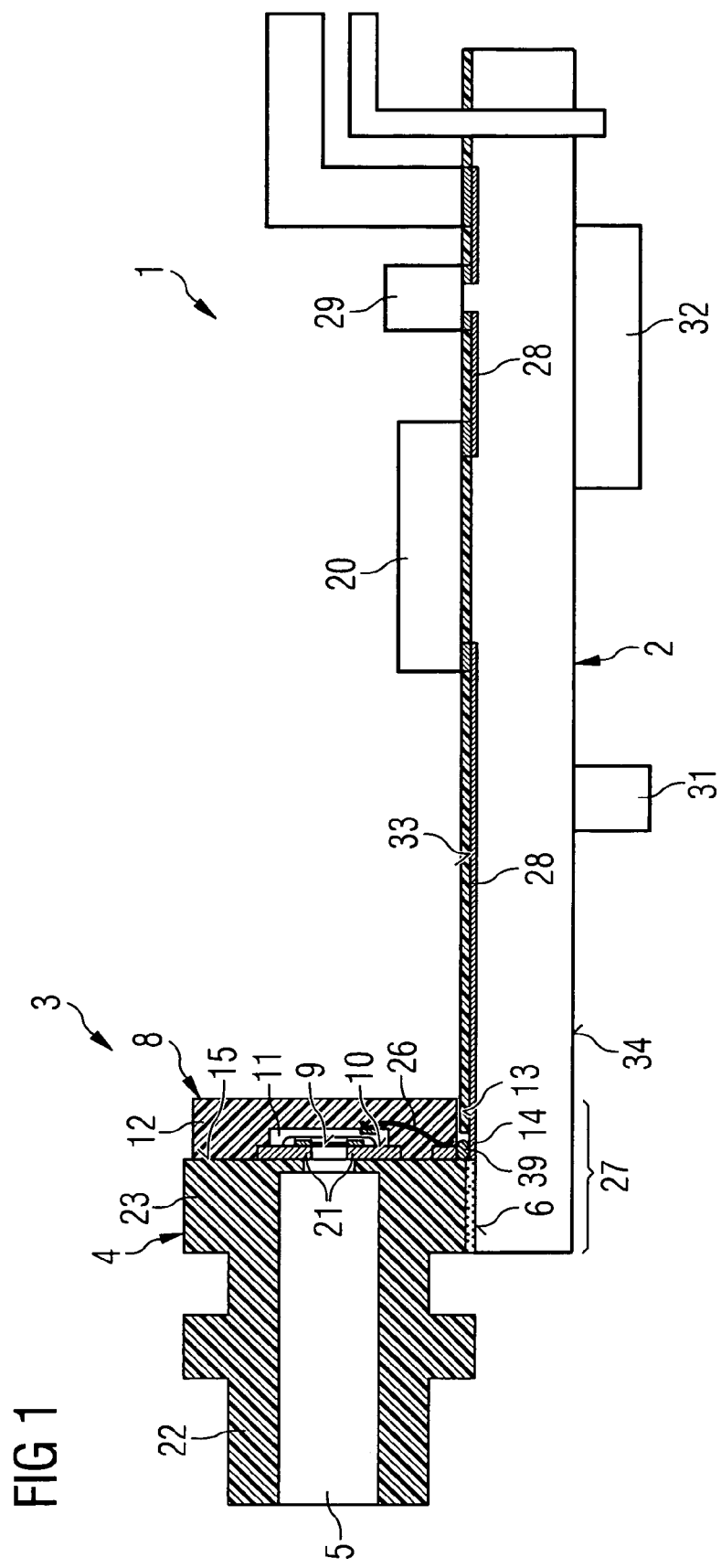
FIG. 1 illustrates a schematic sketch of a module having a circuit carrier and an electro-optical transducer of a first embodiment of the invention.

FIG. 1 illustrates a schematic sketch of a module 1 having a circuit carrier 2 and an electro-optical transducer 3 of a first embodiment of the invention. On the circuit carrier 2, the electro-optical transducer 3 is arranged at an input or an output of the module 1. The circuit carrier 2 has circuit carrier lines 28 and electronic components 20, 29, 31 and 32 of the module 1 on its top side 33 and its underside 34. Said electronic components 20, 29, 31 or 32 are partly electrically connected to the optocoupler 3 via the circuit carrier lines 28.

The electro-optical transducer 3 has an optical waveguide holder 4 with an optical waveguide receptacle 5, into which it is possible to insert an optical waveguide (not shown here), an optical fiber or an optical fiber array or another optical waveguide with a corresponding control element.

In one embodiment, the optical waveguide holder 4 has an end side 15 and a mounting area 6, which are arranged at right angles with respect to one another. The end side 15 is arranged orthogonally with respect to the optical waveguide receptacle 5 and is oriented and mounted, with the aid of the mounting area 6, essentially at right angles with respect to the top side 33 of the circuit carrier 2.

An optoelectronic component 8 with its housing 12 is arranged on the end side 15. The optoelectronic component 8 shown here has a semiconductor chip 11 at its center, said semiconductor chip having an optically active region 9 oriented with respect to the optical waveguide receptacle 5 of the optical waveguide holder 4. Said optically active region 9 is formed by a photodiode, the rear side 37 of the photodiode having the bonding wire 26 and the active top side 10 of the photodiode being surrounded by an annular electrode connected to a corresponding inner section of a flat conductor 21.

Bonding wire 26 and inner sections of flat conductors 21 form internal connections of the optoelectronic component 8 and are connected to outer contact areas 14. The outer contact areas 14 are arranged on one side on an individual housing edge side 13 of the housing 12 of the optoelectronic component 8. Said housing outer edge side 13 forms an elongation of the mounting area 6 of the optical waveguide holder 4 in such a way that the contact areas 14 are oriented with respect to the top side 33 of the circuit carrier 2 and are connected to circuit carrier lines 28 via soldering connections 39.

Forces that act on the radiation guide holder 4 are transmitted to the circuit carrier 2 via the mounting area 6. This largely relieves the optoelectronic component 8 arranged on the end side 15 and also the soldering connections 39, so that an optoelectronic coupling and an electrical transmission of signals within the electro-optical transducer 3 or outside the electro-optical transducer are neither distorted nor disturbed.

Figure 2:
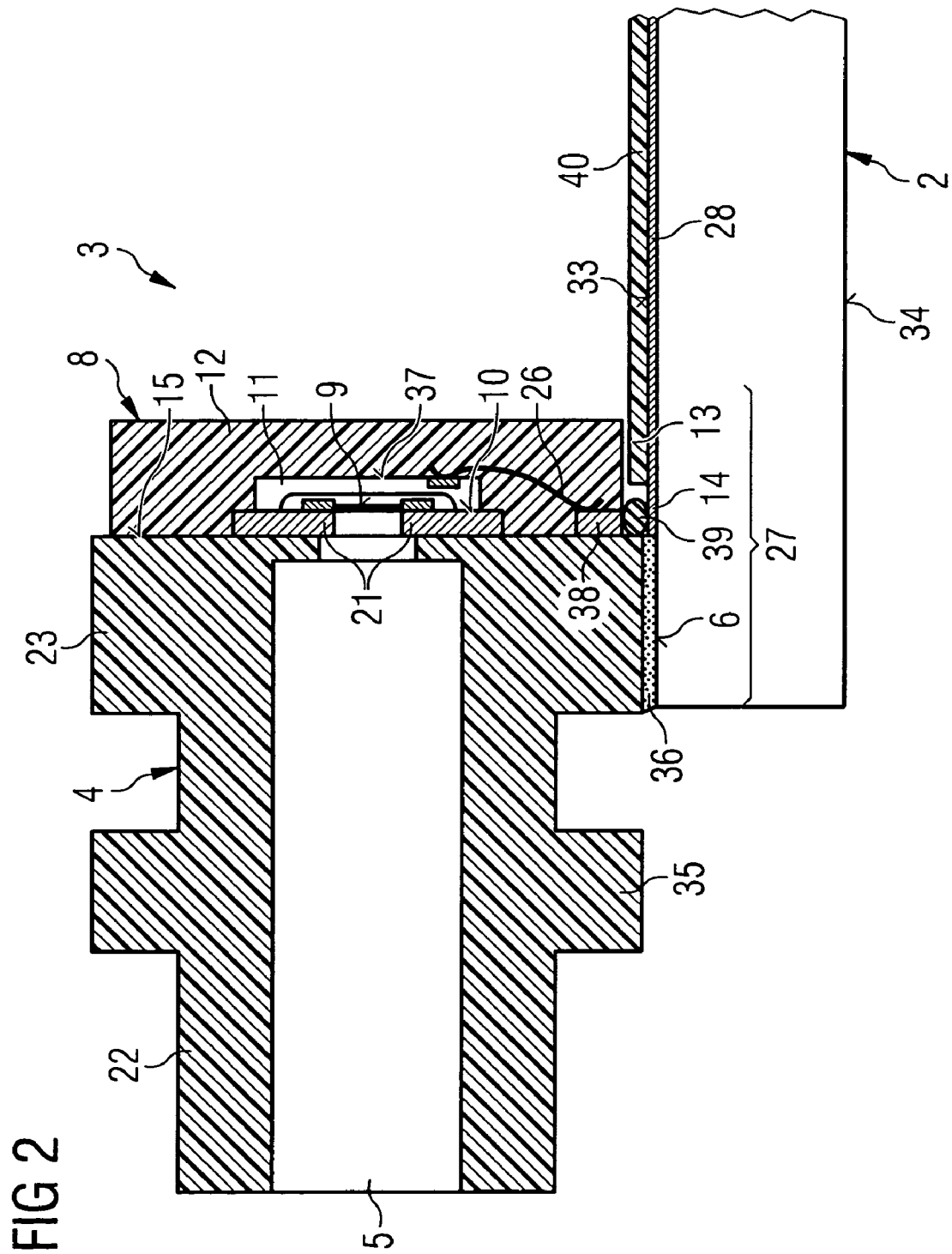
FIG. 2 illustrates a detail of the schematic sketch in accordance with FIG. 1.

FIG. 2 illustrates a detail of the schematic sketch in accordance with FIG. 1. The electro-optical transducer 3 is illustrated with the optical waveguide holder 4, which has two regions 22 and 23. The first region 22 provides the optical waveguide receptacle 5, in which case, for fixing an optical fiber (not shown here), the optical waveguide receptacle 5 is surrounded by a sleeve reinforced with a ring 35.

In one embodiment, the second region 23 of the optical waveguide holder 4 comprises the end area 15 with the mounting area 6 arranged perpendicular thereto, which is mounted by means of e.g. a UV adhesive layer 36 in the edge region 27 of the circuit carrier 2. The semiconductor chip 11 in the form e.g. of a photodiode has the optically active region 9 at the center of its active top side 10. The optical access is ensured through a hole in the flat conductor. Furthermore, the electro-optical transducer may be mounted on an optically transparent circuit carrier, which is in turn mounted on the flat conductor. The rear side 37 of the semiconductor chip 11 forms the cathode of the photodiode and is connected to an inner section of a flat conductor 38 via the bonding wire 26. Said flat conductor 38 has a contact area 14 on the housing outer edge side 13 of the housing 12 of the optoelectronic component 8. The contact area 14 is electrically connected to the circuit carrier line 28 via a soldering connection 39. The circuit carrier line 28 is covered and protected by a soldering resist layer 40 on the top side 33 of the circuit carrier 2.

Figure 3:
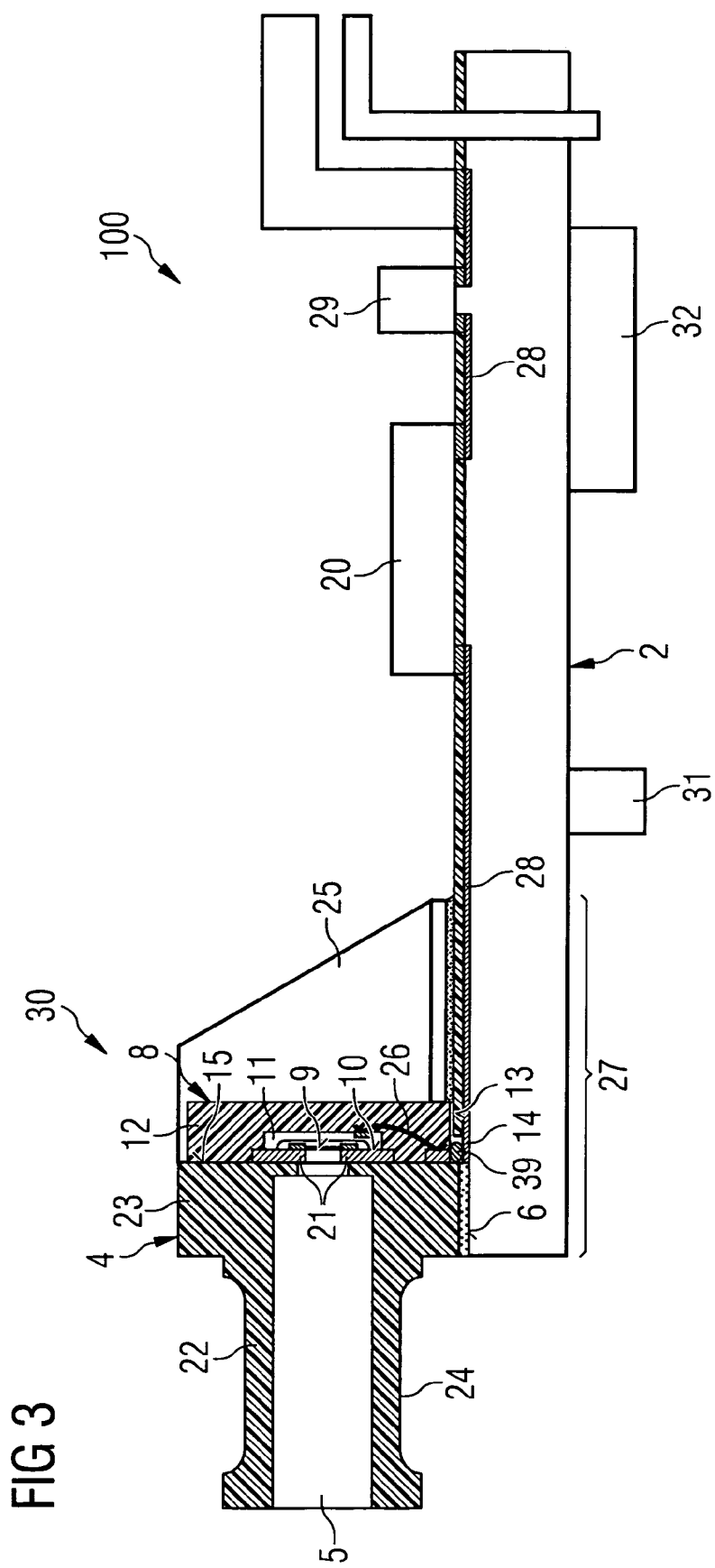
FIG. 3 illustrates a schematic sketch of a module having a circuit carrier and an electro-optical transducer in accordance with a second embodiment of the invention.

FIG. 3 illustrates a schematic sketch of a module 100 having a circuit carrier 2 and an electro-optical transducer 30 in accordance with a second embodiment of the invention. Components with functions identical to those in FIGS. 1 and 2 are identified by the same reference symbols and are not discussed separately.

Module 100 includes optical waveguide holder 4 with a supporting element 25 in the form a supporting rib. Said supporting element 25 is arranged in pairwise fashion on both outer sides of the end side 15 of the optical waveguide holder 4 and, between the two supporting ribs 25, the optoelectronic component 8 is adjusted and fixed on the end side 15.

The entire optical waveguide holder 4 is produced with supporting ribs in one piece in a die-casting process. Afterward, the electro-optical transducer 30 can be completed by application and adjustment of the optoelectronic component 8 on the end area 15 of the optical waveguide holder 4. Afterward, still prior to the process of soldering the electronic components 20, 29, 31 and 32 and the soldering connection of contact areas 14 to the circuit carrier lines 28, the optical waveguide holder 4 is adhesively bonded on the edge region 27 of the circuit carrier 2 by its mounting area 6 by means of UV-curable adhesive. The electronic components 20, 29, 31 and 32 and the contact areas 14 are then soldered together with the circuit carrier lines 28. Finally, the optical fiber (not shown here) is introduced into the optical waveguide receptacle 5 and the sleeve 24 is connected to the optical fiber.

The optical waveguide holder 4 may also be embodied in such a way that it has solderable surfaces and is thus soldered directly together with the connections of the electro-optical transducer 3 onto the circuit board in a large-area manner. In a further embodiment, pins may be concomitantly injection-molded on, which, in a leadthrough technique, are likewise soldered onto the circuit board or riveted thereon.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A module having a circuit carrier and having an electro-optical transducer mounted thereon, the electro-optical transducer comprising:
   an optical waveguide holder having an optical waveguide receptacle, an end side and a mounting area on an edge side of the optical waveguide holder;
   an optoelectronic component having an optically active region on an active top side of a semiconductor chip, and having a housing with a housing outer edge side, on which is arranged at least one contact area for electrically connecting the semiconductor chip to the circuit carrier; and
   wherein the optoelectronic component is arranged with its optically active region on the end side of the optical waveguide holder in such a way that the optical waveguide receptacle and the optically active region are oriented facing one another;
   wherein the mounting area arranged essentially at right angles with respect to the end side on the circuit carrier,
   wherein the end side of the optical waveguide holder is mounted essentially at right angles with respect to the top side of the circuit carrier; and
   wherein the at least one contact area of the optoelectronic component is oriented facing the top side of the circuit carrier.

2. The module of claim 1, wherein the module has an optoelectronic transducer at a module input and the electro-optical transducer at a module output.

3. The module of claim 1, wherein the circuit carrier is populated with at least one electronic component and with a semiconductor chip that has an integrated circuit.

4. The module of claim 1, wherein the optoelectronic component has at least one semiconductor chip, which is connected to inner sections of flat conductors on its active top side, outer sections of the flat conductors being arranged on one side at an individual housing outer edge and having the contact area accessible on the edge side.

5. The module of claim 1, wherein the optoelectronic component has a semiconductor chip, which has a rewiring plate on its active top side with the optically active region being left free, incipiently cut through contacts of the rewiring plate being arranged at an individual housing outer edge and having the contact areas accessible on the edge side.

6. The module of claim 1, wherein the contact area has a solder deposit.

7. The module of claim 1, wherein the contact area has an external contact.

8. The module of claim 1, wherein the circuit carrier has a printed circuit board.

9. The module of claim 1, wherein the circuit carrier has a multilayer ceramic substrate.

10. The module of claim 1, wherein the circuit carrier has a flexible multilayer conductor track sheet.

11. The module of claim 1, wherein the optoelectronic component has, as the semiconductor chip, a laser diode.

12. The module of claim 1, wherein the optoelectronic component has, as the semiconductor chip, a light-emitting diode.

13. The module of claim 1, wherein the optoelectronic component has, as the semiconductor chip, a photodiode.

14. The module of claim 1, wherein the waveguide holder has a mechanical supporting element arranged at the end side.

15. A method for producing an electro-optical transducer comprising:
   die-casting an optical waveguide holder having an end side and molding-in an optical waveguide receptacle toward the end side and molding-on a mounting area on an edge side of the optical waveguide holder at right angles with respect to the end side;
   producing an optoelectronic component, including:
      applying at least one semiconductor chip having an optically active region to a rewiring structure comprising flat conductors;

connecting the optoelectronic component to the flat conductors via conductor tracks;

forming at least one contact area of a flat conductor, said contact area being arranged on a housing outer edge side; and packaging the optoelectronic component in a housing with the contact area being left free; and applying the optoelectronic component to the end side of the optical waveguide holder of such that the contact area is essentially parallel with the mounting area and such that the optical waveguide receptacle faces the optically active region; and mounting the optical waveguide holder on a top side of a circuit carrier such that the end side of the optical waveguide holder is essentially at right angles with respect to the top side of the circuit carrier.

16. The method of claim 15, wherein the conductor tracks of the semiconductor chip are electrically connected to the flat conductors by means of bonding technology via bonding wires.

17. The method of claim 15, wherein the semiconductor chip is adhesively bonded onto inner sections of flat conductors of a flat leadframe.

18. The method of claim 15, wherein the optoelectronic component is adhesively bonded onto the end side of the optical waveguide holder.

19. A method for producing a module having a circuit carrier and an electro-optical transducer, comprising:

die-casting an optical waveguide holder having an end side and molding-in an optical waveguide receptacle toward the end side and molding-on a mounting area on an edge side of the optical waveguide holder at right angles with respect to the end side;

producing an optoelectronic component, including:

applying at least one semiconductor chip having an optically active region to a rewiring structure comprising flat conductors;

connecting the optoelectronic component to the flat conductors via conductor tracks;

forming at least one contact area of a flat conductor, said contact area being arranged on a housing outer edge side; and packaging the optoelectronic component in a housing with the contact area being left free;

applying the optoelectronic component to the end side of the optical waveguide holder such that the contact area is essentially parallel with the mounting area and such that the optical waveguide receptacle faces the optically active region;

bonding the mounting side of the electro-optical transducer onto an edge region of the circuit carrier such that the end side of the optical wave guide holder is essentially at right angles with respect to a top side of the circuit carrier; and connecting the contact area of the electro-optical transducer to a circuit carrier line.

20. The method of claim 19, wherein the contact area is soldered to a circuit carrier line.

* * * * *

UNITED STATES PATENT AND TRADEMARK OFFICE
CERTIFICATE OF CORRECTION

| | |
|---|---|
| PATENT NO. | : 7,101,092 B2 |
| APPLICATION NO. | : 10/797365 |
| DATED | : September 5, 2006 |
| INVENTOR(S) | : Gottfried Beer and Thomas Killer |

It is certified that error appears in the above-identified patent and that said Letters Patent is hereby corrected as shown below:

Column 8, line 10, delete "mounting area arranged essentially" and insert in place thereof -- mounting area is arranged essentially --.

Signed and Sealed this

Tenth Day of April, 2007

JON W. DUDAS
*Director of the United States Patent and Trademark Office*